US012727734B2

(12) United States Patent
Vail et al.

(10) Patent No.: US 12,727,734 B2
(45) Date of Patent: Sep. 8, 2026

(54) SENSING ASSEMBLY FOR AN APPLIANCE

(71) Applicant: Haier US Appliance Solutions, Inc., Wilmington, DE (US)

(72) Inventors: Declan Vail, Seattle, WA (US); Jamie L. Brandewie, Cincinnati, OH (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 135 days.

(21) Appl. No.: 18/675,962

(22) Filed: May 28, 2024

(65) Prior Publication Data

US 2025/0366696 A1 Dec. 4, 2025

(51) Int. Cl.

| | |
|---|---|
| ***A47L 15/42*** | (2006.01) |
| ***A47L 15/00*** | (2006.01) |
| ***A47L 15/46*** | (2006.01) |
| ***E05F 15/70*** | (2015.01) |

(52) U.S. Cl.

CPC ....... *A47L 15/4257* (2013.01); *A47L 15/0018* (2013.01); *A47L 15/4246* (2013.01); *A47L 15/46* (2013.01); *E05F 15/70* (2015.01); *A47L 2401/26* (2013.01); *A47L 2501/22* (2013.01); *E05Y 2900/304* (2013.01)

(58) Field of Classification Search

None

See application file for complete search history.

(56) References Cited

U.S. PATENT DOCUMENTS

| | | | |
|---|---|---|---|
| 4,951,693 A | 8/1990 | Archambault | |
| 8,440,028 B2 | 5/2013 | Christmann et al. | |
| 8,906,168 B2 | 12/2014 | Dalsing | |
| 9,049,929 B2 | 6/2015 | Kilgore et al. | |
| 11,788,340 B2 | 10/2023 | Walz et al. | |
| 2004/0163684 A1 | 8/2004 | Hapke | |
| 2012/0187270 A1 | 7/2012 | Haarlander et al. | |
| 2013/0057134 A1 | 3/2013 | Kilic | |
| 2013/0232877 A1 | 9/2013 | Tiekoetter | |
| 2021/0274993 A1* | 9/2021 | Kopera | A47L 15/4259 |

FOREIGN PATENT DOCUMENTS

| | | |
|---|---|---|
| CN | 209539017 U | 10/2019 |
| CN | 110984760 A | 4/2020 |
| CN | 212546849 U | 2/2021 |
| CN | 214220897 U | 9/2021 |
| CN | 217429950 U | 9/2022 |

(Continued)

OTHER PUBLICATIONS

WO 2021175651 A1 machine translation, Water-Conducting Domestic Appliance Comprising a Switchable Automatic or Manual Door-Opening Assembly, Wegener (Year: 2021).*

*Primary Examiner* — Cristi J Tate-Sims

(74) *Attorney, Agent, or Firm* — Dority & Manning, P.A.

(57) ABSTRACT

A dishwasher appliance includes: a tub defined by a top wall, a sidewall coupled with the top wall, and a bottom wall coupled with the sidewall. The dishwasher appliance further includes a door rotatably coupled with at least one of the sidewall and the bottom wall. The door includes a contact flange. The dishwasher appliance further includes an actuating member coupled with the sidewall. The actuating member is movable between a retracted position and an extended position. The actuating member in the extended position engages the contact flange.

18 Claims, 11 Drawing Sheets

(56) References Cited

FOREIGN PATENT DOCUMENTS

| | | | | |
|---|---|---|---|---|
| CN | 217525039 | U | 10/2022 | |
| CN | 219220057 | U | 6/2023 | |
| DE | 102011050914 | A1 | 12/2012 | |
| DE | 102013109620 | A1 | 3/2015 | |
| EP | 2394558 | B1 | 9/2016 | |
| EP | 3841947 | A1 * | 6/2021 | ......... A47L 15/4259 |

* cited by examiner

SENSING ASSEMBLY FOR AN APPLIANCE

FIELD OF THE INVENTION

The present subject matter relates generally to dishwasher appliances, and more particularly, to systems for supporting a door of a dishwasher appliance.

BACKGROUND OF THE INVENTION

Dishwasher appliances generally include a tub. Doors can be rotatably mounted to the tub. The door can seal the tub during an operating cycle. Sealing the tub with the door may contain fluids, including humid air, within the tub. After an operating cycle, there may be a drying cycle that attempts to dry contents of the tub while the door is sealing the tub.

Notably, the contents of the tub, typically dishes and crockery, may still be wet even after the drying cycle is complete. These issues may require users to spend extra time and effort drying the dishes and crockery manually. Users may also be forced to manually open the door to let the humid air escape the tub over several hours. These issues may require service calls and may result in customer dissatisfaction.

Accordingly, a dishwasher appliance includes features to promote drying of the contents within the tub after an operating cycle would be desirable. More specifically, features that automatically dry the dishes and crockery without taking up a lot of space within the kitchen would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment, a dishwasher appliance includes: a tub defined by a top wall, a sidewall coupled with the top wall, and a bottom wall coupled with the sidewall; a door rotatably coupled with at least one of the sidewall and the bottom wall, the door comprising a contact flange; and an actuating member coupled with the sidewall, the actuating member is movable between a retracted position and an extended position, wherein the actuating member in the extended position engages the contact flange.

In another exemplary embodiment, a method of operating a door actuating mechanism for a dishwasher, the dishwasher comprises a tub having a sidewall, a door rotatably coupled with the tub, and an actuator assembly coupled to the sidewall, the actuator assembly has a driving member and an actuating member operably coupled with the driving member, and a sensing assembly is communicatively coupled with the driving member, the method includes: determining an operating cycle is complete; extending the actuating member via the driving member to rotate the door; receiving a deactivation signal from a sensor of the sensing assembly; and retracting the actuating member in response to receiving the deactivation signal from the sensor.

In yet another exemplary embodiment, a method of assembling auto-opening a dishwasher appliance, the method includes: coupling, rotatably, a door of the dishwasher appliance with a tub of the dishwasher appliance; disposing one of an activator and a sensor of a sensing assembly within a contact flange of the door; coupling an actuator assembly with the tub such that the actuator assembly engages the sensing assembly of the contact flange of the door in a closed position and the door in an unsealed position; and coupling an opposite of the activator and the sensor of the sensing assembly with the actuator assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
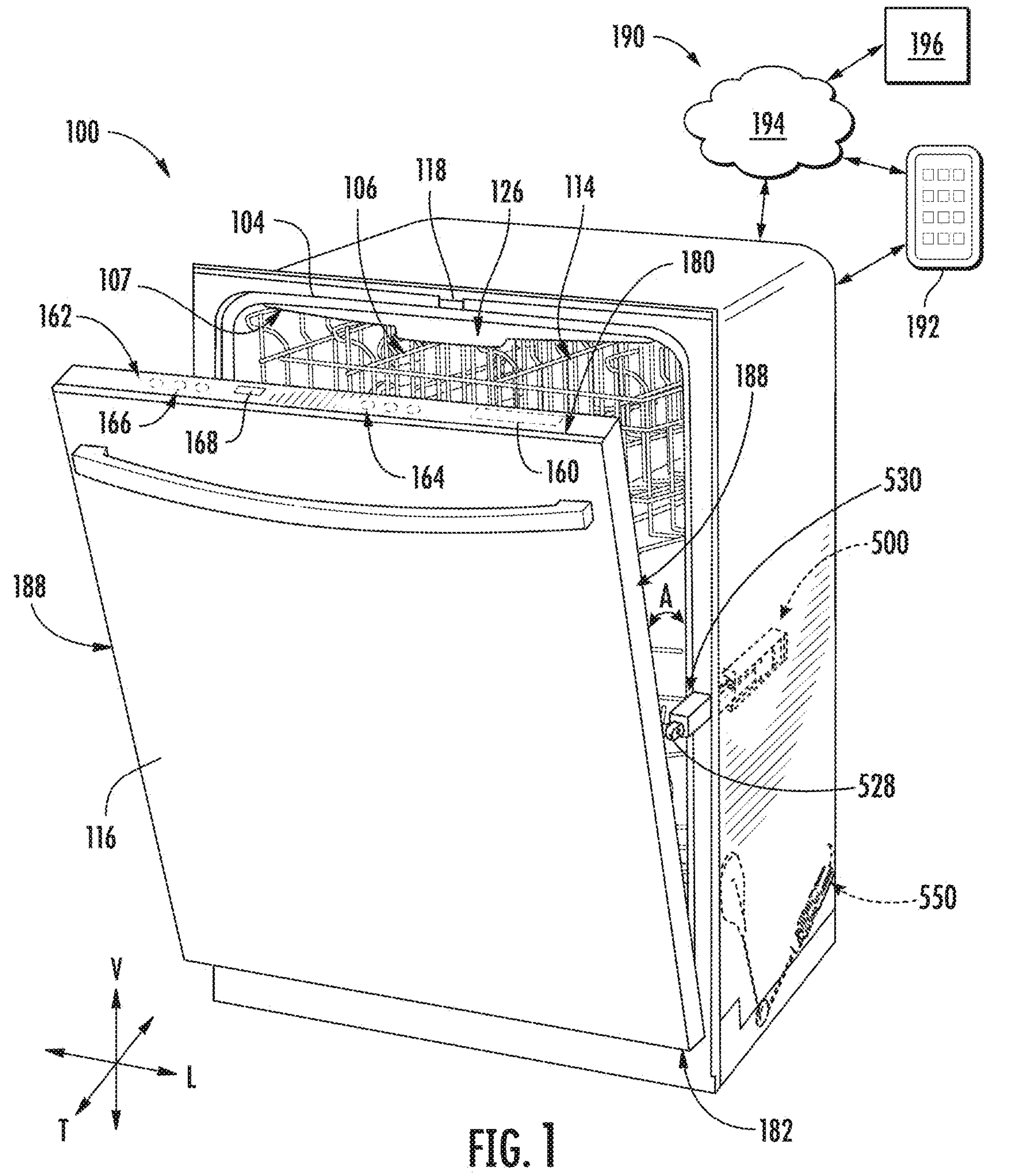
FIG. 1 provides a perspective view of a dishwasher appliance showing a dishwasher door in an unsealed position according to an example embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, the term "or" is generally intended to be inclusive (i.e., "A or B" is intended to mean "A or B or both"). Furthermore, as used herein, terms of approximation, such as "approximately," "substantially," or "about," refer to being within a ten percent margin of error.

Figure 2:
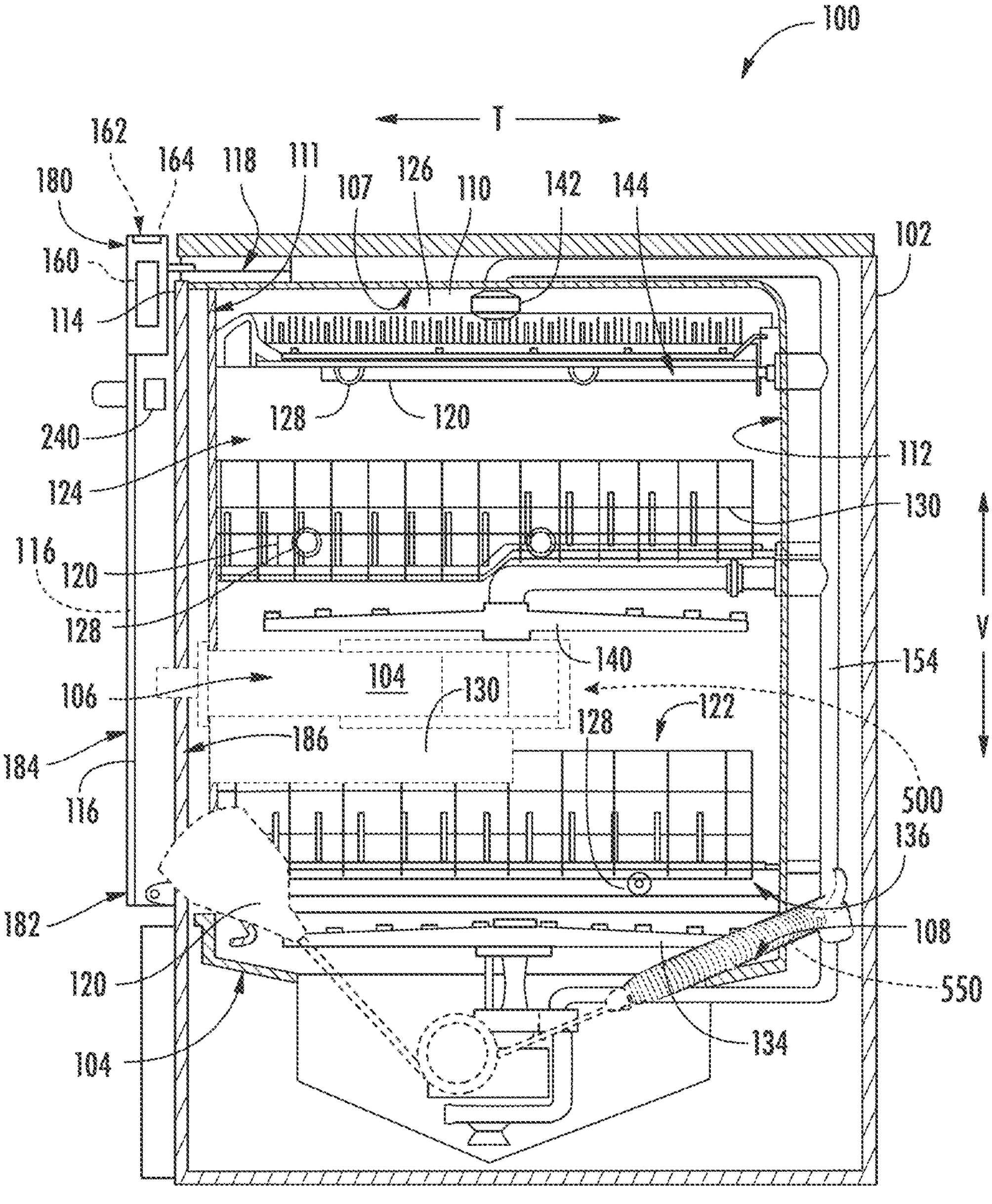
FIG. 2 provides a side elevation view of the dishwasher appliance of FIG. 1 according to an example embodiment of the present subject matter.
Figure 3:
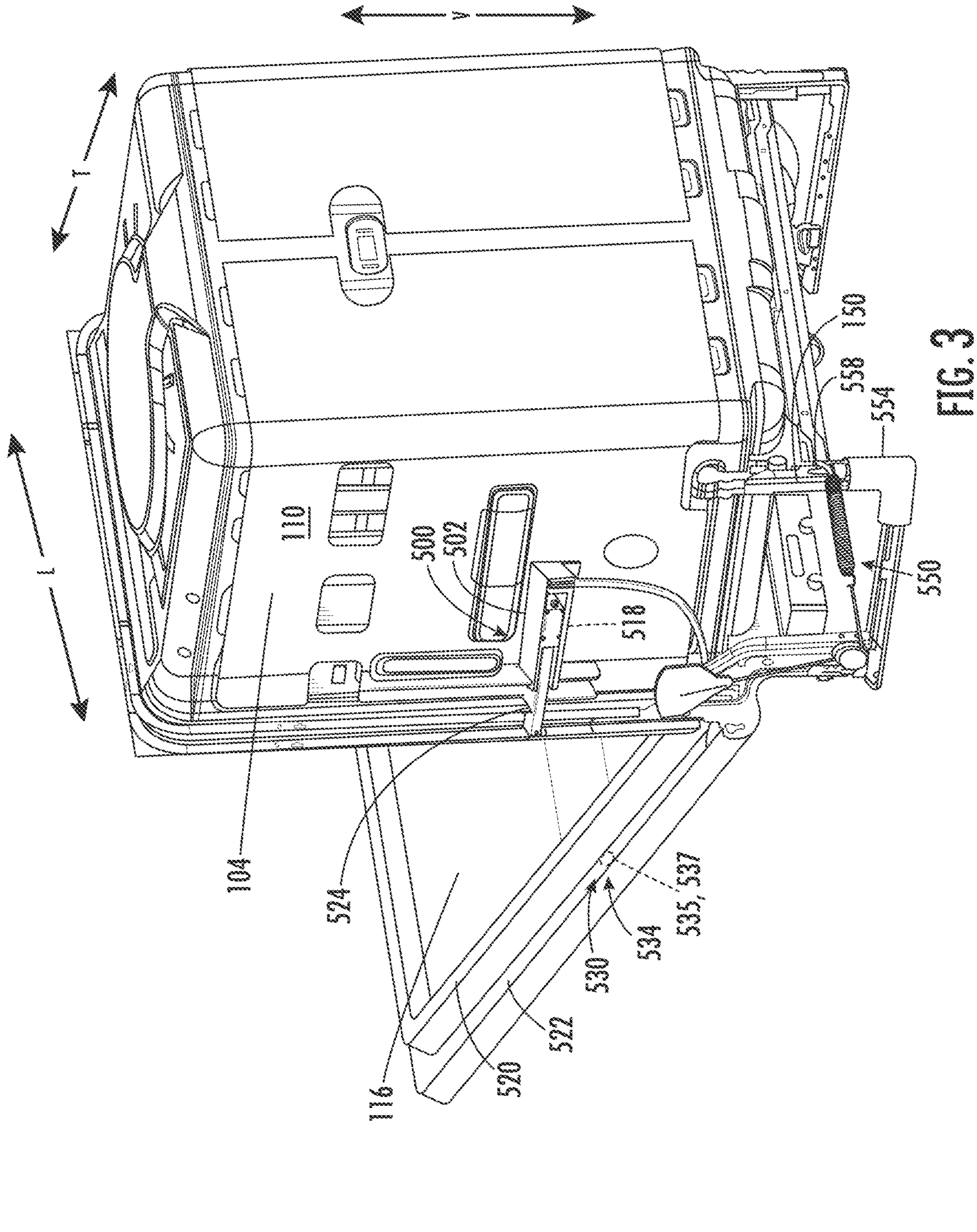
FIG. 3 provides a rear perspective view of the dishwasher appliance of FIG. 1 showing the dishwasher door in an open position according to an example embodiment of the present subject matter.
Figure 4:
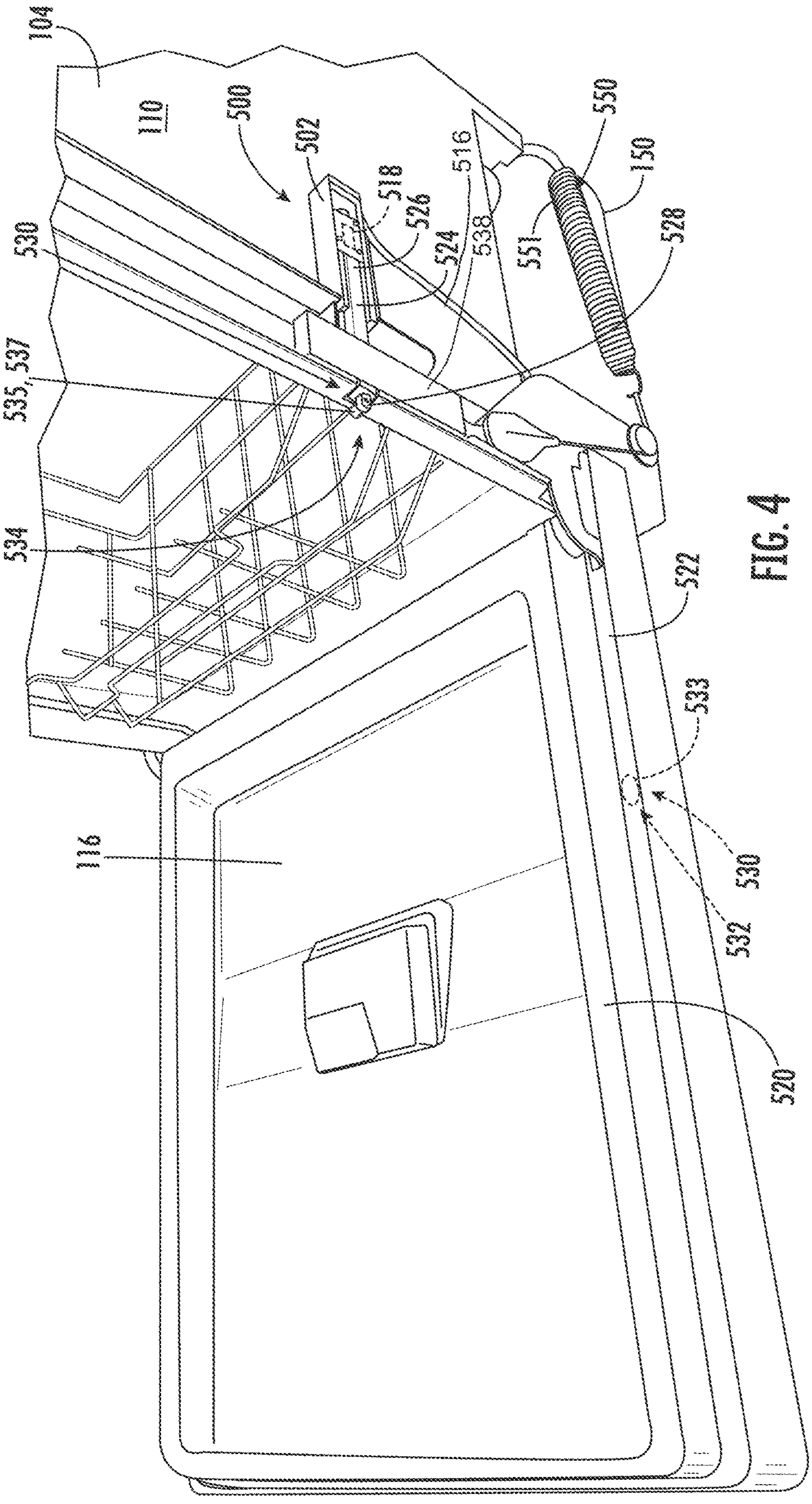
FIG. 4 provides a perspective view of the dishwasher appliance of FIG. 3 showing the dishwasher door in an open position according to an example embodiment of the present subject matter.

FIGS. 1 and 2 depict an exemplary domestic dishwashing appliance or dishwasher 100 that may be configured in accordance with aspects of the present disclosure. The dishwasher 100 may also be referred to as an appliance and a dishwasher appliance. For the particular embodiment of FIGS. 1 and 2, the dishwasher 100 includes a cabinet 102 having a tub 104 therein that defines a wash chamber 106. As shown, tub 104 extends between a top 107, or top wall, and a bottom 108, or bottom wall, along a vertical direction V, between a pair of sidewalls 110 along a lateral direction L, and between a front side 111 and a rear side 112 along a transverse direction T. The tub 104 has a height that extends along the vertical direction V. The pair of sidewalls 110 may also be referred to as tub sidewalls, or singularly as a sidewall. Each of the vertical direction V, lateral direction L, and transverse direction T are mutually orthogonal to one another.

As illustrated in FIG. 2, tub sidewalls 110 may accommodate a plurality of rack assemblies. More specifically, guide rails 120 may be mounted to sidewalls 110 for supporting a lower rack assembly 122, a middle rack assembly 124, and an upper rack assembly 126. As illustrated, upper rack assembly 126 is positioned at a top portion of wash chamber 106 above middle rack assembly 124, which is positioned above lower rack assembly 122 along the vertical direction V. Each rack assembly 122, 124, 126 is adapted for movement between a loading position (not shown) in which the rack is substantially positioned outside the wash chamber 106, and a washing position (shown in FIGS. 1 and 2) in which the rack is located inside the wash chamber 106. This is facilitated, for example, by a plurality of rollers 128 mounted onto rack assemblies 122, 124, 126, respectively. Although guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles (e.g., during a cleaning or rinsing cycle). According to another exemplary embodiment, a silverware basket (not shown) may be removably attached to a rack assembly (e.g., lower rack assembly 122) for placement of silverware, utensils, and the like, that are otherwise too small to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a lower spray arm assembly 134 disposed in a lower region 136 of wash chamber 106 to rotate in relatively close proximity to lower rack assembly 122. Similarly, a mid-level spray arm assembly 140 is located in an upper region of wash chamber 106 and may be located below and in close proximity to middle rack assembly 124. In this regard, mid-level spray arm assembly 140 may generally be configured for urging a flow of wash fluid up through middle rack assembly 124 and upper rack assembly 126. Additionally, an upper spray assembly 142 may be located above upper rack assembly 126 along the vertical direction V. In this manner, upper spray assembly 142 may be configured for urging or cascading a flow of wash fluid downward over rack assemblies 122, 124, and 126. As further illustrated in FIG. 2, upper rack assembly 126 may further define an integral spray manifold 144, which is generally configured for urging a flow of wash fluid substantially upward along the vertical direction V through upper rack assembly 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water or wash fluid (e.g., detergent, water, or rinse aid) in the tub 104.

It should be appreciated that the invention is not limited to any particular style, model, or configuration of dishwasher 100. The exemplary embodiment depicted in FIGS. 1 and 2 is for illustrative purposes only. For example, different configurations may be provided for rack assemblies 122, 124, 126, different spray arm assemblies 134, 140, 142 and spray manifold configurations may be used, and other differences may be applied while remaining within the scope of the present subject matter. Moreover, aspects of the present subject matter may be applied to other appliances as well, such as refrigerators, ovens, microwaves, etc.

The tub 104 includes a front opening 114 and a door 116 hinged at its bottom for movement between a normally closed vertical position, or closed position, (shown in FIG. 2), wherein the wash chamber 106 is sealed shut for washing operation, and a horizontal open position, or open position, for loading and unloading of articles from the dishwasher 100. The closed position may also be referred to as a sealed position. The door 116 in the open position may be angled at about 90 degrees from the tub 104. The door 116 between the open position and the closed position may be in an unsealed position. The door 116 in the unsealed position may be at an angle between 0 degrees and 90 degrees, as described in more detail below. The unsealed position promotes drying of the contents within the tub 104 while not taking up as much space within a home compared to the door 116 that would be in the open position. According to exemplary embodiments, dishwasher 100 further includes a door closure mechanism or assembly 118 that is used to lock and unlock door 116 for accessing and sealing wash chamber 106. The door closure mechanism 118 may also be referred to as a latch. The latch, or door closure mechanism 118 may apply a latch force to the door 116 such that the door 116 is retained in the closed position.

Referring now generally to FIGS. 1 and 2, door 116 will be described according to exemplary embodiments of the present subject matter. Although door 116 is described herein as being used with dishwasher 100, it should be appreciated that door 116 or variations thereof may be used on any other suitable residential or commercial appliance. As described herein, door 116 may share a coordinate system with dishwasher 100, e.g., when door 116 is in the closed position (e.g., as shown in FIG. 2). Specifically, door 116 may define a vertical direction V, a lateral direction L, and a transverse direction T. Therefore, these directions may be used herein to refer to features of door 116 and its various components and sub-assemblies.

As shown, in the normally closed position, door 116 extends from a top end or top edge 180 to a bottom end or bottom edge 182 along the vertical direction V; from a front end 184 to a rear end 186 along the transverse direction T; and between two lateral ends 188 along the lateral direction L. According to exemplary embodiments, door 116 may be formed from one or more exterior panels that define an interior chamber of door 116. The door 116 further comprises a sealing rim 520 that selectively engages the tub 104 to seal the tub 104. The door 116 further comprises a contact flange 522 that peripherally extends from the sealing rim 520 such that the lateral ends 188 are located on the contact flange 522. According to exemplary embodiments, the exterior panels of door 116 may be panels that are stamped from stainless steel or may be formed from any other suitably rigid material, such as thermoformed plastic, other metals, etc. In general, the exterior panels of door 116 may be assembled in any suitable manner, e.g., may be secured together using any suitable mechanical fastener, welding, snap-fit mechanisms, etc. In addition, it should be appreciated that an insulating material (not shown), such as fiberglass or foam insulation, may be positioned within door 116 to provide thermal and/or sound insulation to dishwasher 100.

Referring to FIGS. 1-7, the dishwasher appliance further comprises a collar bracket 504 coupled with the front side 111 of the tub 104. More specifically, the collar bracket 504 at least partially circumscribes the tub 104 proximal the front side 111. Further, because the collar bracket 504 at least partially circumscribes the tub 104, the collar bracket 504 may be generally ⋂-shaped from a front elevation view. The collar bracket 504 increases rigidity of the tub 104. The tub 104 may comprise a plurality of guide fins 506 that are unitarily coupled with the tub 104. The collar bracket 504 is coupled with the tub 104 between the plurality of guide fins 506 proximal the door 116 in the closed position. The collar bracket 504 may have a cross-section that is generally U-shaped, e.g., to increase structural rigidity to tub 104.

The dishwasher appliance 100 comprises an actuating assembly 500 that is generally coupled with the sidewall 110 of the tub 104. The actuating assembly 500 comprises an actuator housing 502 that is specifically mounted to the sidewall 110. The actuator housing 502 may be coupled with the sidewall 110 of the tub 104 within a lower half of the height of the tub 104 along the vertical direction V. Additionally, or alternatively, the actuator housing 502 may be coupled to the sidewall 110 within between 20% and 50% of the height of the tub 104 along the vertical direction V. Additionally, or alternatively, the actuator housing 502 may be coupled to the sidewall 110 within between 30% and 40% of the height of the tub 104 along the vertical direction V. Additionally, or alternatively, the actuator housing 502 may be coupled to the sidewall 110 at about 33% of the height of the tub 104 along the vertical direction V. For example, if the height of the tub 104 is 100 cm, the actuator housing 502 may be coupled to the sidewall 110 at about 33 cm vertically up from the bottom 108 and about 67 cm vertically down from the top 107.

The actuator housing 502 may be mounted to the sidewall 110 via a double-sided adhesive layer, welding, at least one fastener such as a screw, rivet, or other equivalent. The actuator housing 502 may be made from a polymeric material, a metallic material, a ceramic, or a combination therein. The actuator housing 502 is generally oblong in shape with the direction of major extent extending between the front side 111 and the rear side 112 of the tub 104 (e.g., along the transverse direction T). Additionally, or alternatively, the actuator housing 502 may be rectangular and prismatic, such as a truncated pyramid, for example. The actuator housing 502 may be disposed in at least one of the first recess 508, the second recess 510, or the third recess 512. The actuator housing 502 may be flush with at least one of the collar bracket 504 or the plurality of guide fins 506 at the first recess 508, the second recess 510, or the third recess 512, respectively.

The actuating assembly 500 further comprises a driving member 518 disposed within the actuator housing 502. The driving member 518 may comprise a solenoid, a hydraulic motor, an electric motor, or another similar alternative. The driving member 518 may further comprise a worm gear or other similar alternative.

The actuating assembly 500 further comprises an actuating member 524 movably mounted to the actuator housing 502, the actuating member 524 being movable between an extended position and a retracted position via the driving member 518. The actuating member 524 may be oblong in shape. Additionally, or alternatively, the actuating member 524 may be rectangular and prismatic. The collar bracket 504 defines a first recess 508 and a second recess 510 aligned with the first recess 508, such that the U-shape of the cross-section of the collar bracket 504 at the first recess 508 and the second recess 510 may be shortened. Additionally, or alternatively, the collar bracket 504 may be non-contiguous to define the first recess 508 and the second recess 510 with the sidewall 110 of the tub 104. The plurality of guide fins 506 may define at least a third recess 512 that is aligned with the first recess 508 and the second recess 510. The actuating member 524 extends through the first recess 508, the second recess 510, and the third recess 512. Additionally, or alternatively, the collar bracket 504 and the plurality of guide fins 506 may define a passage 514 for the actuating member 524 to extend through. The passage 514 may be defined by the first recess 508, the second recess 510, and the third recess 512. Alternatively, the passage 514 may be defined by respective apertures defined by the collar bracket 504 and the plurality of guide fins 506.

The actuating member 524 comprises a first end part 526 that is proximal to the driving member 518 and a second end part 528, opposite the first end part 526, that is distal from the driving member 518. The first end part 526 may be referred to as a proximal end. The second end part 528 may be referred to as a distal end. The actuating member 524 may move between the extended position and the retracted position via axial rotation, radial rotation, translation, or a combination thereof.

The actuating member 524 is at least partially disposed within the actuator housing 502. The actuating member 524 extends through at least the first recess 508, the second recess 510, and the third recess 512. Additionally, or alternatively, the actuating member 524 may also extend through the fourth recess 514 and the fifth recess 516 as shown in the examples of the actuating member 524 in FIGS. 6 and 7.

Figure 5:
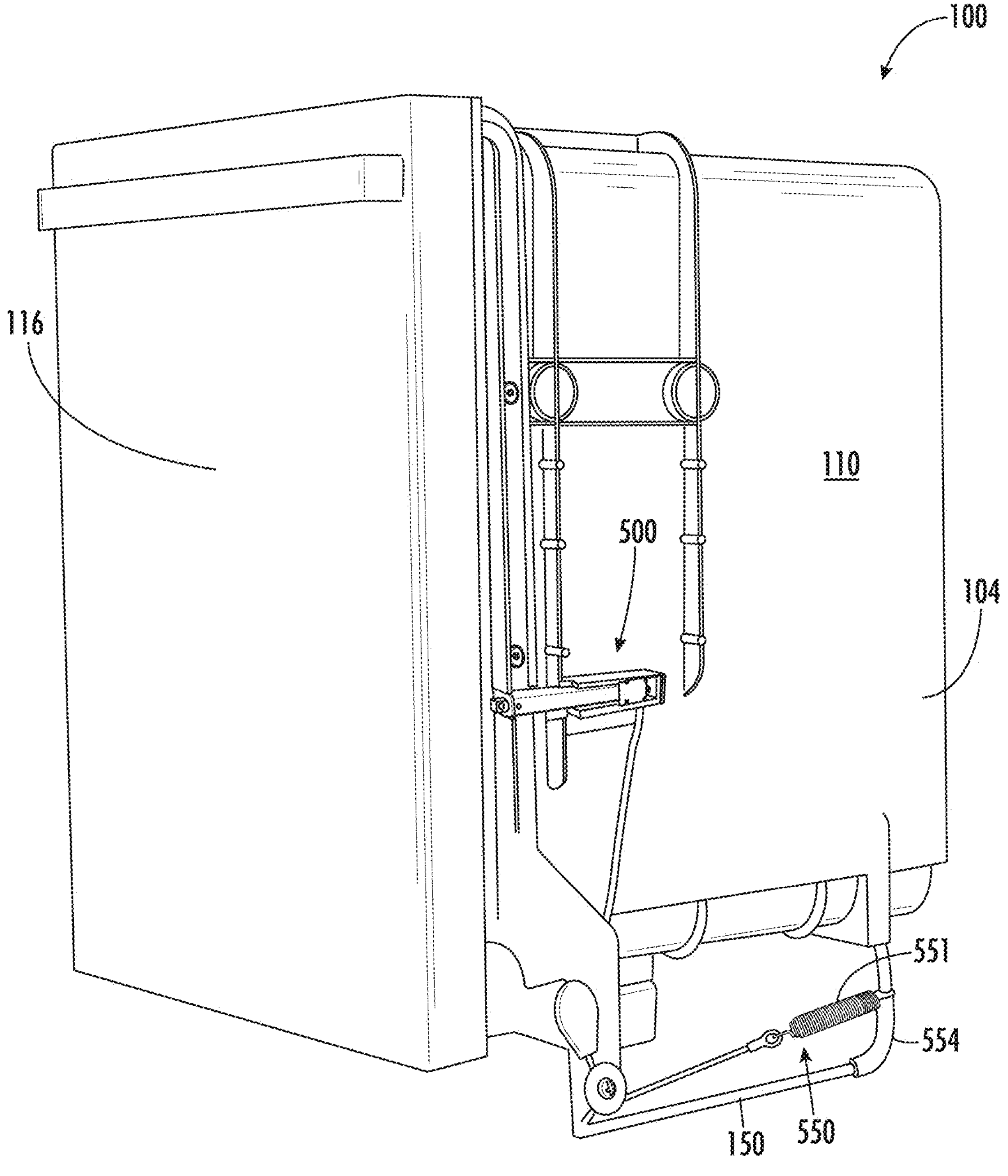
FIG. 5 provides a perspective view of the dishwasher appliance of FIG. 1 showing the dishwasher door in a closed position according to an example embodiment of the present subject matter.
Figure 6:
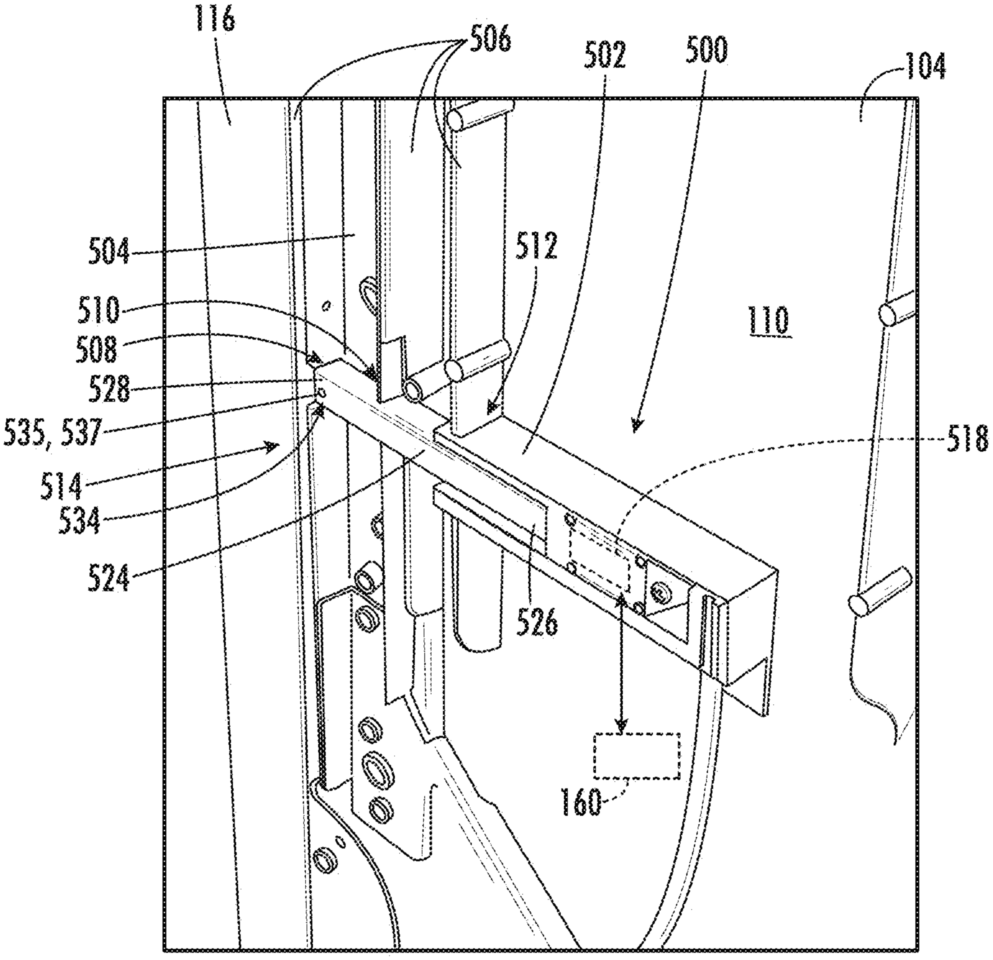
FIG. 6 provides a rear perspective view of the dishwasher of FIGS. 1-3 showing an actuating assembly according to an example embodiment of the present subject matter.
Figure 7:
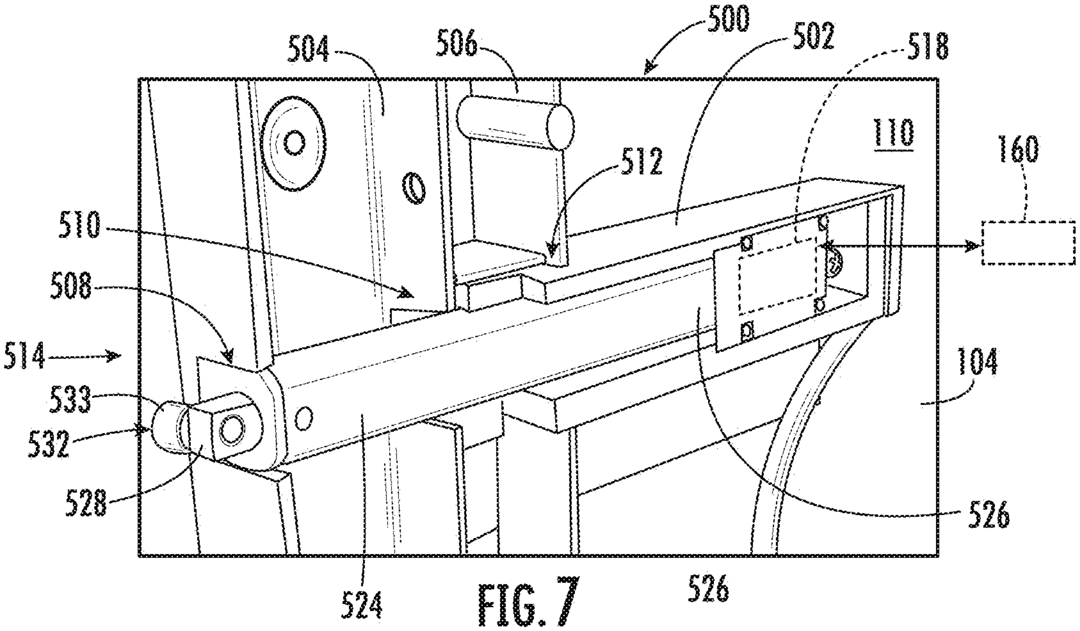
FIG. 7 provides a front perspective view of the actuating assembly of FIG. 4 according to an example embodiment of the present subject matter.
Figure 8:
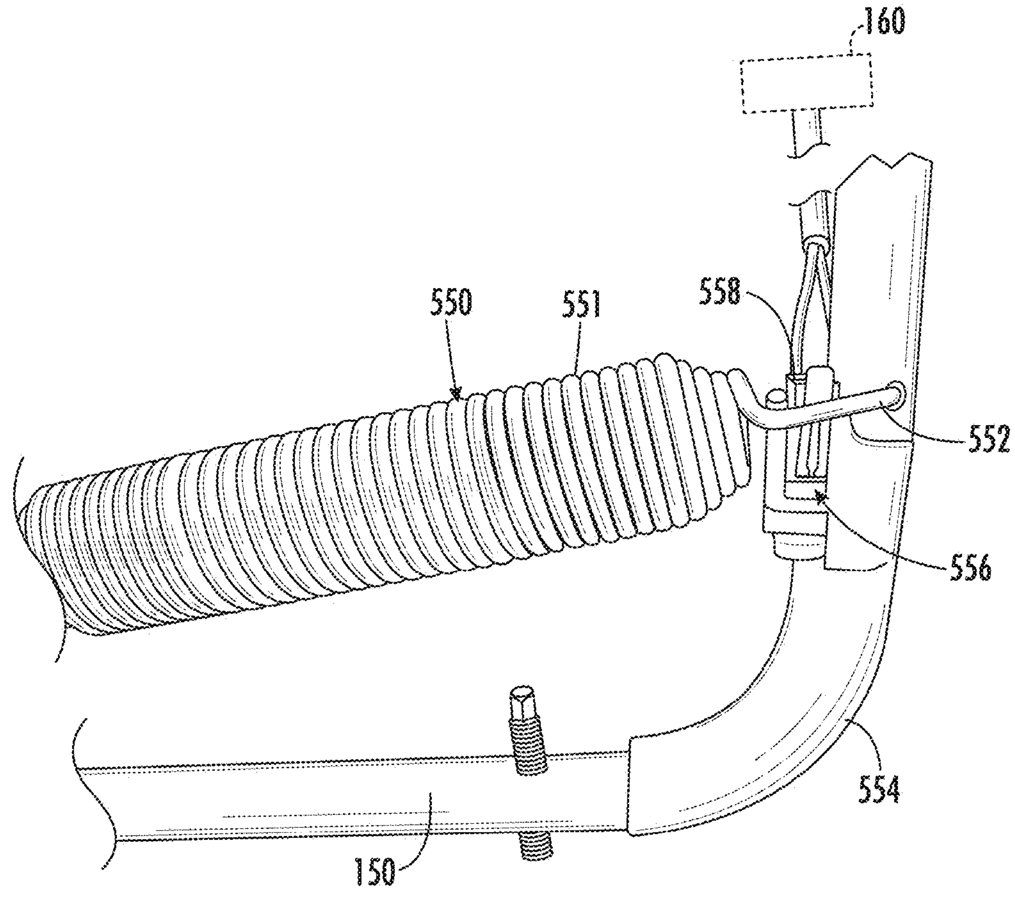
FIG. 8 provides a perspective zoomed in view of a biasing member and a limit switch according to an example embodiment of the present subject matter.
Figure 9:
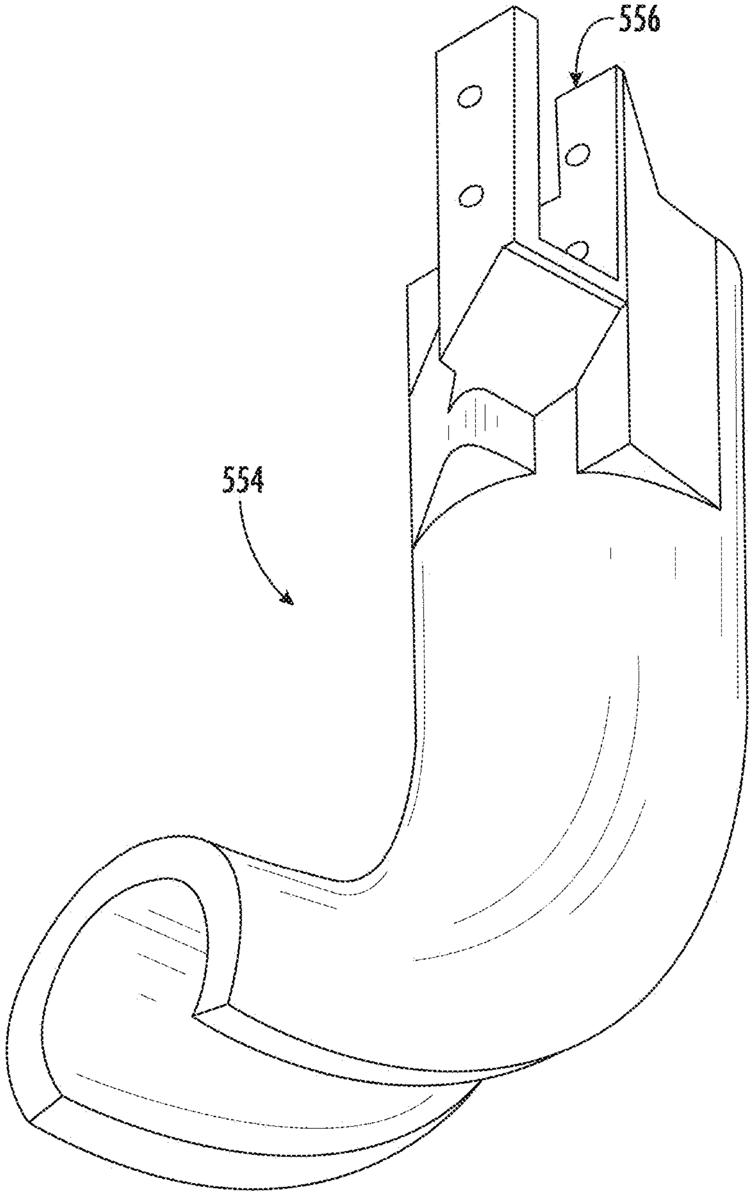
FIG. 9 provides a perspective view of a limit switch housing of the leg of FIG. 7 according to an example embodiment of the present subject matter.

The actuating member 524 that moves from the retracted position to the extended position is configured to engage the contact flange 522 proximal a lateral side of the door 116 to move the door 116 from the closed position, shown in FIG. 5, to the unsealed position, shown in FIG. 1. The actuating member 524 may apply an actuator force to the door 116 to move the door 116 between the closed position and the unsealed position. According to example embodiments, the actuator force is greater than the latch force. The second end part 528 of the actuating member 524 engages door 116 in the unsealed position. For example, second end part 528 may engage contact flange 522 of door 116 or any other suitable portion or surface of door 116.

Advantageously, the actuating member 524 of the actuating assembly 500 that is mounted on the sidewall 110 extends a shorter distance compared to a mechanism that opens the door 116 from the top 107. The actuating member 524 in the extended position moves the door 116 to the unsealed position such that an angle A between the door 116 and the tub 104 is more than 0 degrees but less than 90 degrees. Additionally, or alternatively, the angle A of the door 116 in the unsealed position may be between about 1 degree and about 30 degrees. Additionally, or alternatively, the angle A of the door 116 in the unsealed position may be between about 2 degrees and about 20 degrees. Additionally, or alternatively, the angle A of the door 116 in the unsealed position may be between about 3 degrees and about 15 degrees.

The door 116 in the unsealed position defines a gap 536 between the door 116 and the tub 104 such that air flows through the gap 536. The gap 536 permits air to flow from the tub 104 and into the tub 104. The size of the gap 536 is determined by the angle A between the door 116, in the unsealed position, and the tub 104. Thus, the gap 536 is determined by how far the actuating member 524 extends in the extended position and where the actuating assembly is coupled along the height H of the sidewall 110 along the vertical direction V. Where the actuating assembly 500 is coupled with the sidewall 110 along the height H of the sidewall 110 along the vertical direction V is inversely proportional to the size of the gap 536. How far the actuating member 524 extends is directly proportional to the size of the gap 536.

The dishwasher appliance 100 further comprises a sensing assembly 530 coupled with the contact flange 522 of the door 116 and the actuating member 524. The sensing assembly 530 detects when the door 116 has moved to the open position. Detecting when the door 116 has moved to the open position is related to operating the actuating member, as described below in greater detail. The sensing assembly 530 comprises an activator 532 and a sensor 534. The activator 532 is coupled with one chosen from the contact flange 522 and the actuating member 524. Additionally, or alternatively, the activator 532 and the sensor 534 may be coupled with the second end part 528. The sensor 534, opposite the activator 532, is coupled with the opposite of the contact flange 522 and the actuating member 524. In other words, the activator 532 and the sensor 534 may be swapped between the door 116 and the actuating member 524. The activator 532 and the sensor 534 may be at least partially disposed within the contact flange 522 and the actuating member 524, respectively.

The illustrated embodiment shows the activator 532 as a magnet 533. Alternatively, the activator may comprise a protrusion, or an electromagnetic (E.M.) emitting mechanism. The illustrated embodiment shows the sensor 534 as a reed switch 535, or a Hall effect sensor 537. Alternatively, the sensor 534 may comprise a mechanical switch, or an E.M. sensor. The sensor 534 is triggered by the activator 532 that is out of proximity of the sensor 534. In the illustrated embodiment, the magnet 533 will not apply a sufficient magnetic force originating from the magnet 533 to the reed switch 535 or the Hall effect sensor 537 if the door 116 is in the open position because the sensor 534 and the activator 532 are not in proximity, thus triggering the reed switch 535 or Hall effect sensor 537. Alternatively, the activator 532 mechanically may trigger the sensor 534. The sensor 534 that is triggered may generate a trigger signal.

Referring now generally to FIGS. 3, 4, 8, and 9, the dishwasher appliance 100 may further include legs or vertical supports 150 that extend from a rear end of each of the tub 104 upward along the vertical direction V. Vertical supports 150 are generally configured for supporting wash tub 104. As shown for example in FIGS. 1 and 2, the vertical support 150 may generally be covered in an apron or cabinet structure (e.g., referred to herein generally as cabinet 102).

The dishwasher appliance 100 further comprises a biasing member 550 that, as shown in the illustrated embodiment, is coupled with the vertical support 150 and the door 116. Alternatively, the biasing member 550 may be coupled with the door 116 and the tub 104, the cabinet 102, any other fixed portion of the dishwasher appliance 100, or any other fixed portion of an external environment within proximity of the dishwasher appliance 100. The biasing member 550 extends between the vertical support 150 and the door 116. The biasing member 550 may extend underneath the tub 104. The biasing member 550 biases the door 116 toward the closed position. For example, the biasing member 550 may apply a biasing force to the door 116 to bias the door 116 to the closed position. Therefore, the actuator force may be greater than the sum of the biasing force and the latch force. The biasing member 550 may comprise a hook 552 that directly couples with the vertical support 150. As shown in the example illustrated embodiment, the biasing member 550 is a mechanical spring 551. Alternatively, the biasing member 550 may comprise a hydraulic, a cable, or other similar mechanism that has a spring constant. For example, the biasing member 550 may be chosen based on Hooke's law.

The dishwasher appliance 100 may further comprises a limit switch housing 554 coupled with the leg, or vertical support 150. The limit switch housing 554, as shown in the examples in FIG. 9, may at least partially circumscribe the leg, or vertical support 150. Additionally, or alternatively, the limit switch housing 554 may be complementary in shape compared to the leg, or vertical support 150. The limit switch housing 554 may be made of a polymeric material such that the limit switch housing 554 flexes to receive the vertical support 150 and thus snaps onto the vertical support 150. The limit switch housing 554 defines a cavity 556.

The dishwasher appliance 100 further comprises a limit switch 558 operably coupled with the biasing member 550. The limit switch 558 may be in direct contact with the hook 552 of the biasing member 550. For example, the limit switch 558 may generate a presence signal if the hook 552 is contacting the limit switch 558. The limit switch 558 is disposed within the limit switch housing 554. Additionally, or alternatively, the limit switch 558 may be disposed within the cavity 556 of the limit switch housing 554. The limit switch 558 is configured to detect whether the biasing member 550 is present. Additionally, or alternatively, the limit switch 558 may be configured to detect whether the biasing member 550 is extending between the vertical support 150 and the door 116. Additionally, or alternatively, the limit switch 558 may be configured to detect whether the biasing member 550 is in tension. The limit switch 558 is further configured to generate a presence signal in response to detecting presence of the biasing member 550. It should be appreciated that the dishwasher appliance 100 may comprise more than one vertical support 150, biasing member 550, limit switch housing 554, cavity 556, and limit switch 558. For example, the dishwasher appliance 100 may further comprise a second leg coupled with the tub, a second biasing member coupled with the second leg, and a second tension sensor operably coupled with the second biasing member.

The dishwasher 100 is further equipped with a controller 160 to regulate operation of the dishwasher 100. The controller 160 is communicatively coupled with the actuating assembly 524 and the sensing assembly 530. Additionally, the controller 160 may be directly communicatively coupled with the driving member 518. The controller 160 is further communicatively coupled with the limit switch 558.

The controller 160 is configured to determine that an operating cycle is complete, extend the actuating member 524 to move the door 116 to the unsealed position, receive the trigger signal from the sensing assembly 530, and retract the actuating member 524 in response to receiving the trigger signal. The controller 160 is further configured to identify a door opening request, receive the presence signal from the limit switch 558, determine that the biasing member 550 is present, and extend the actuating member 524, via the driving member 518, toward the contact flange 522 of the door 116 in response to determining the biasing member 550 is present. Additionally, or alternatively, the controller 160 may be further configured to determine whether the biasing member 550 is extending between the vertical support 150 and the door and whether the biasing member 550 is in tension. The controller 160 may be further configured to retract the actuating member 524 in response to determining that the biasing member 550 is absent. The controller 160 may be further configured to prevent extension of the actuating member 524 in response to determining that the biasing member 550 is absent.

The controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 160 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, the controller 160 may be located within a control panel area 162 of a door 116, as shown in FIGS. 1 and 2. In such an embodiment, input/output ("I/O") signals may be routed between the control system and various operational components of dishwasher 100 along wiring harnesses that may be routed through the bottom of the door 116. Typically, the controller 160 may be in operative communication with a user interface panel 164 through which a user may select various operational features and modes and monitor progress of the dishwasher 100. In one embodiment, the user interface 164 may represent a general purpose I/O ("GPIO") device or functional block. In certain embodiments, the user interface 164 includes input components 166, such as one or more of a variety of electrical, mechanical or E.M. input devices including capacitive touch screens/buttons, rotary dials, push buttons, and touch pads. The user interface 164 may further include one or more display components 168, such as a digital display device or one or more indicator light assemblies designed to provide operational feedback to a user. The user interface 164 may be in communication with the controller 160 via one or more signal lines or shared communication busses. Additionally, or alternatively, the controller 160 may be configured to instruct the display to provide a user notification to a user that the biasing member 550 is absent in response to the limit switch 558 failing to detect the biasing member 550.

Referring still to FIGS. 1 and 2, user interface panel 164 is positioned proximate top edge 180 of door 116 along the vertical direction V. In this manner, user interface panel 164 may be partially hidden below a countertop when dishwasher appliance 100 is installed below the countertop and door 116 is closed. Accordingly, dishwasher appliance 100 may be referred to as a "top control dishwasher appliance." However, it should be appreciated that aspects of the present subject matter may be used with dishwasher appliances having other configurations or any other suitable appliance. For example, user interface panel 164 may be alternately positioned on front face or front end 184 of door 116.

User interface panel 164 is positioned on door 116 such that a user can engage or interact with user interface panel 164, e.g., to select operating cycles and parameters, activate/deactivate operating cycles, or adjust other operating parameters of dishwasher appliance 100. User interface panel 164 may include a printed circuit board (not shown) that is positioned within door 116. According to exemplary embodiments, printed circuit board may include or be operatively coupled to controller 160 and/or user interface panel 164. In addition, user interface panel 164 may include or be operably coupled to one or more user inputs or touch buttons (e.g., identified generally herein as user inputs 166) for receiving user input, providing user notifications, or illuminating to indicate cycle or operating status. Additionally, or alternatively, the controller 160 may be configured to instruct the interface panel to provide a user notification to a user that the biasing member 550 is absent in response to the limit switch 558 failing to detect the biasing member 550.

Specifically, according to the illustrated embodiment, user inputs 166 include a plurality of capacitive sensors that are mounted to user interface panel 164 and are operable to detect user inputs. For example, these capacitive sensors may be configured for triggering when a user touches a top edge 180 of user interface panel 164 in a region associated with a particular user input 166. In particular, these capacitive sensors can detect when a finger or another conductive material with a dielectric different than air contacts or approaches user interface panel 164, along with the precise location, pressure, etc. of the finger interaction.

When a user touches top edge 180 of user interface panel 164 adjacent one of user inputs 166, the associated capacitive sensors may be triggered and may communicate a corresponding signal to controller 160. In such a manner, operations of dishwasher appliance 100 can be initiated and controlled. According to exemplary embodiments, the capacitive sensors may be distributed laterally on user interface panel 164. It will be understood that other any suitable number, type, and position of capacitive sensors may be used while remaining within the scope of the present subject matter. Indeed, any suitable number, type, and configuration of user inputs 166 may be used while remaining within the scope of the present subject matter.

User interface panel 164 may define a plurality of surfaces that are intended to be illuminated for various purposes. For example, user inputs 166 may be illuminated by light sources to inform the user of the location of the button or to provide some other status indication. Notably, this illumination is typically achieved by directing a light beam along the vertical direction V onto top edge 180 of user interface panel 164. Door 116 may further include a plurality of light sources or lighting devices that are configured for illuminating one or more surfaces of user interface panel 164. It should be appreciated that these light sources may include any suitable number, type, configuration, and orientation of light sources mounted at any suitable location to illuminate status indicators or buttons in any suitable colors, sizes, patterns, etc. In other words, the light sources may be provided as any suitable number, type, position, and configuration of electrical light source(s), using any suitable light technology and illuminating in any suitable color. For example, the light sources may include one or more light emitting diodes (LEDs), which may each illuminate in a single color (e.g., white LEDs), or which may each illuminate in multiple colors (e.g., multi-color or RGB LEDs) depending on the control signal from controller 160.

However, it should be appreciated that according to alternative embodiments, the light sources may include any other suitable traditional light bulbs or sources, such as halogen bulbs, fluorescent bulbs, incandescent bulbs, glow bars, a fiber light source, etc. Moreover, the light sources may be operably coupled (e.g., electrically coupled) to controller 160 or another suitable control board to facilitate activation or illumination of the light sources (e.g., to indicate a user input, state of the dishwasher appliance, state of the wash cycle, or any other relevant information to a user).

According to exemplary embodiments, user interface panel 164 may be any suitable transparent or semitransparent feature for diffusing, directing, or otherwise transmitting light from a light source. For example, user interface panel 164 may be formed from a suitable transparent or translucent material configured to direct light energy, such as a dielectric material, such as glass or plastic, polycarbonate, polypropylene, polyacrylic, or any other suitable material.

In addition, user interface panel 164 may be a dead fronted panel. As used herein, the term "dead front" and the like is generally intended to refer to portions of a control panel which may be used as indicators, buttons, interactive control surfaces, or other user-interaction features without exposing the user to the operating side of the equipment or live parts and connections, i.e., lights, electrical connections, etc. For example, user interface panel 164 may include a transparent or translucent body and an opaque masking material that is selectively printed on top edge 180 of the translucent body to define capacitive touch buttons or user inputs 166.

The opaque material may be deposited on the translucent body to define any suitable number, size, and configuration of illuminated features. These illuminated features may be shapes or include other forms such as symbols, words, etc. that are visible on user interface panel 164. More specifically, when light sources are energized, capacitive touch buttons or user inputs 166 on top edge 180 may be illuminated. Thus, the dead fronted top edge 180 may be the surface that is contacted for controlling dishwasher appliance 100 or which may be illuminated for purposes of indicating operating status or other conditions to the user of the dishwasher appliance 100.

Referring still to FIG. 1, a schematic diagram of an external communication system 190 will be described according to an exemplary embodiment of the present subject matter. In general, external communication system 190 is configured for permitting interaction, data transfer, and other communications between dishwasher appliance 100 and one or more external devices. For example, this communication may be used to provide and receive operating parameters, user instructions or notifications, performance characteristics, user preferences, or any other suitable information for improved performance of dishwasher appliance 100. In addition, it should be appreciated that an external communication system 190 may be used to transfer data or other information to improve performance of one or more external devices or appliances and/or improve user interaction with such devices.

For example, external communication system 190 permits controller 160 of dishwasher appliance 100 to communicate with a separate device external to dishwasher appliance 100, referred to generally herein as an external device 192. As described in more detail below, these communications may be facilitated using a wired or wireless connection, such as via a network 194. In general, external device 192 may be any suitable device separate from dishwasher appliance 100 that is configured to provide and/or receive communications, information, data, or commands from a user. In this regard, external device 192 may be, for example, a personal phone, a smartphone, a tablet, a laptop or personal computer, a wearable device, a smart home system, or another mobile or remote device.

In addition, a remote server 196 may be in communication with dishwasher appliance 100 and/or external device 192 through network 194. In this regard, for example, remote server 196 may be a cloud-based server 196, and is thus located at a distant location, such as in a separate state, country, etc. According to an exemplary embodiment, external device 192 may communicate with a remote server 196 over network 194, such as the Internet, to transmit/receive data or information, provide user inputs, receive user notifications or instructions, interact with or control dishwasher appliance 100, etc. In addition, external device 192 and remote server 196 may communicate with dishwasher appliance 100 to communicate similar information.

In general, communication between dishwasher appliance 100, external device 192, remote server 196, and/or other user devices or appliances may be carried using any type of wired or wireless connection and using any suitable type of communication network, non-limiting examples of which are provided below. For example, external device 192 may be in direct or indirect communication with dishwasher appliance 100 through any suitable wired or wireless communication connections or interfaces, such as network 194. For example, network 194 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 190 is described herein according to an exemplary embodiment of the present subject matter. However, it should be appreciated that the exemplary functions and configurations of external communication system 190 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Referring generally to FIGS. 1 through 12, the dishwasher appliance 100 may be assembled by coupling, rotatably, the door 116 of the dishwasher appliance 100 with the tub 104 of the dishwasher appliance 100. The dishwasher 100 may be further assembled by disposing one of the activator 532 and the sensor 534 of the sensing assembly 530 within the contact flange 522 of the door 116. The dishwasher may be further assembled by coupling the actuator assembly 500 with the tub 104 such that the actuator assembly 500 engages the sensing assembly 530 of the contact flange 522 of the door 116 in a closed position and of the door 116 in an unsealed position. The dishwasher 100 may be even further assembled by coupling an opposite of the activator 532 and the sensor 534 of the sensing assembly 530 with the actuator assembly 500. Additionally, the activator 532, or alternatively the sensor 534, may be coupled with the second end part 528 of the actuating member 524 of the actuating assembly 500. In other words, the activator 532 and the sensor 534 may be swapped between the actuating member 524 and the door 116.

Figure 10:
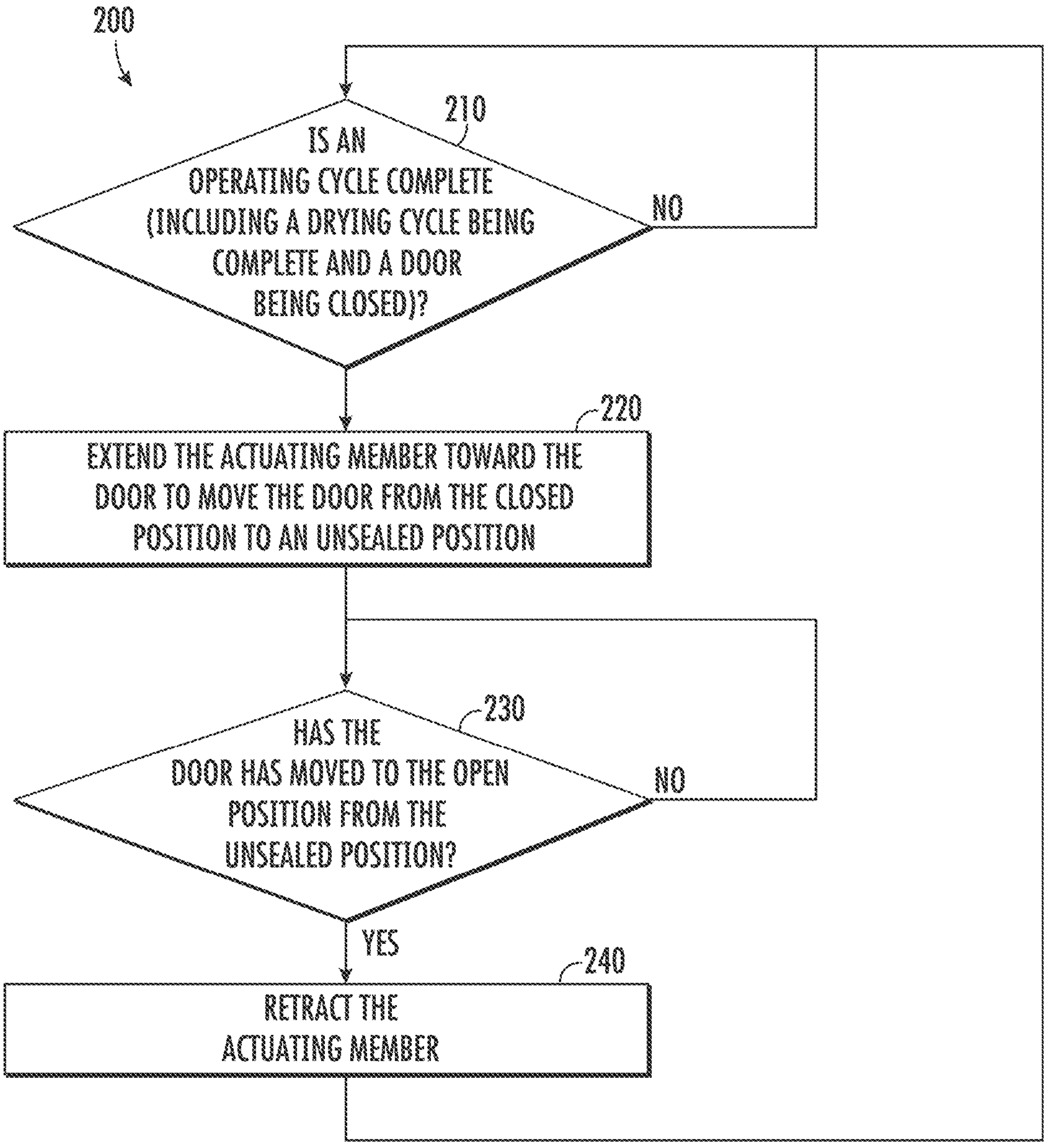
FIG. 10 provides a method for operating an auto-open door of a dishwasher appliance in accordance with one embodiment of the present disclosure.

Referring generally to FIG. 10, a method 200 is illustrated therein. The method 200 may be generally carried out by the controller 160. The method comprises step 210 that determines whether an operating cycle is complete. Step 210 may comprise determining whether a drying cycle is complete, and whether the door 116 is in the closed position. Step 210 may further comprise, for example, that the user interface 164 has provided a user notification that the operating cycle is complete. If step 210 is answered no, the method 200 repeats step 210. If step 210 is answered yes, the method 200 proceeds to a step 220.

Step 220 comprises extending the actuating member 524 toward the door 116 to move the door 116 from the closed position to the unsealed position. The controller 160 instructs the driving member 518 to move the actuating member 524 to the extended position. As a result of the actuating member 524 moving to the extended position, the door 116 moves, rotatably, from the closed position to the unsealed position. If step 220 is answered no, the method 200 repeats step 220. After step 220 has completed, the method proceeds to a step 230.

Step 230 comprises determining whether the door 116 has moved to the open position from the unsealed position. When the actuating member 524 is in the extended position, the door 116 is in the unsealed position. The door 116 may move to the open position, for example, by a user of the dishwasher appliance 100 during unloading of the tub 104 of cookware or dishes. As described above, the door 116 in the open position brings the sensor 534 and the activator 532 out of proximity, thus triggering the sensor 534. When the sensor 534 is triggered, the sensor 534 generates a trigger signal that is received by the controller 160. In response, the controller 160 determines that the door 116 is in the open position. If step 230 is answered no, the method 200 repeats step 230. If step 230 is answered yes, the method proceeds to a step 240.

Step 240 comprises retracting the actuating member 524. The controller 160 instructs the driving member 518 to retract the actuating member 524 in response to the controller 160 determining that the door 116 is in the open position. The actuating member 524 in the retracted position permits the door 116 to move from the open position to the closed position. If the actuating member 524 is not retracted, the door 116 pivots between the unsealed position and the open position. Permitting the door 116 to move to the closed position allows the dishwasher appliance to run the operating cycle again.

Figure 11:
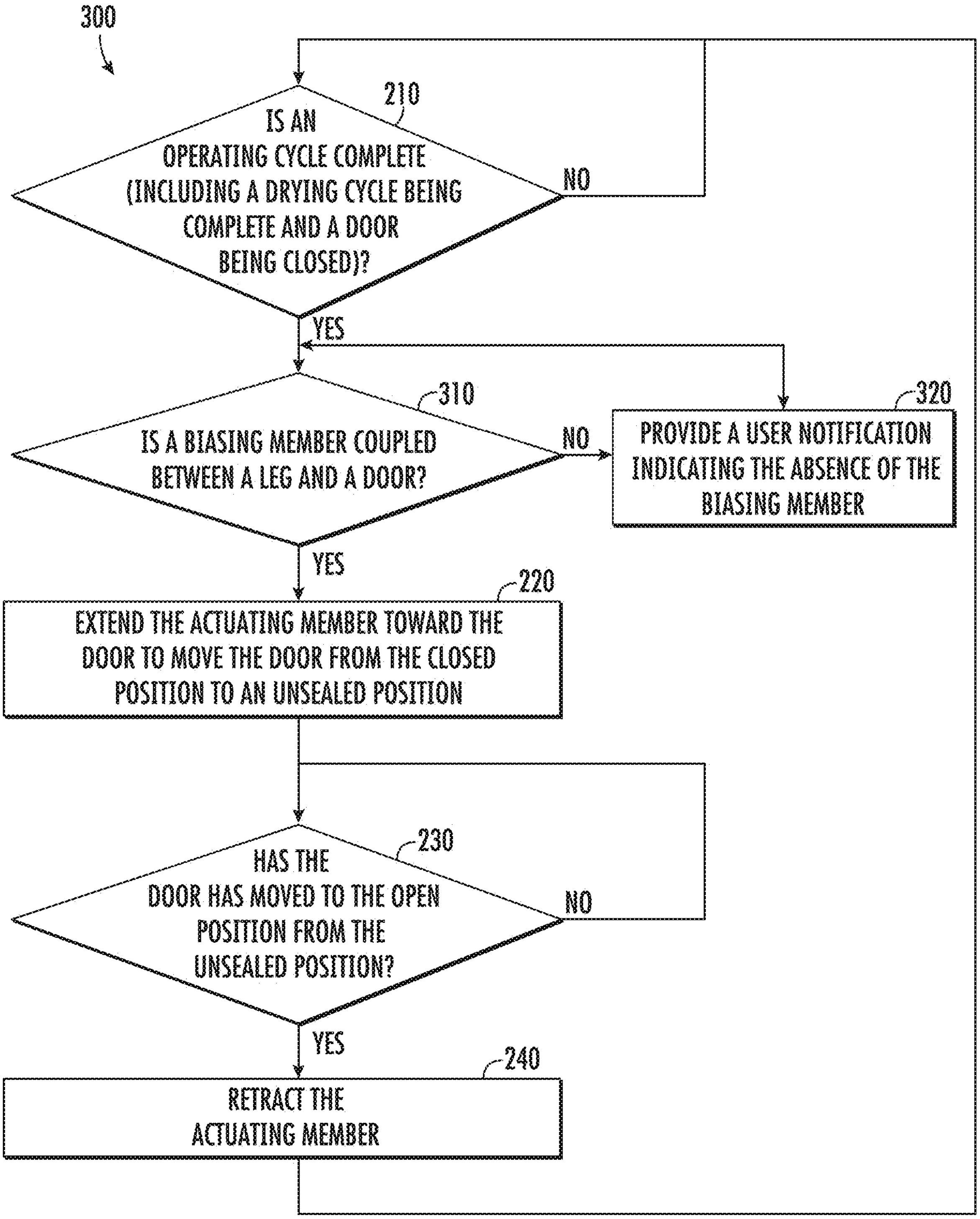
FIG. 11 provides a method of operating an auto-open door of a dishwasher appliance with a limit switch operably coupled to a biasing member according to an example embodiment of the present subject matter.

Referring generally to FIG. 11, a method 300 comprises steps 210, 220, 230, and 240 as described above. Method 300 further comprises the step 310. If step 210 is not answered in the affirmative, the method 300 repeats step 210. If step 210 is answered affirmatively, the method proceeds to a step 310.

Step 310 comprises determining whether the biasing member 550 is coupled between the leg, or vertical support 150 and the door 116. The limit switch 558 detects a presence of the biasing member 550 and in response to detecting the biasing member 550, the limit switch generates a presence signal. The controller 160 receives the presence signal and in response determines the biasing member 550 is present. The limit switch 558 may generate the presence signal if the biasing member 550 is in proximity to the limit switch 558, if the biasing member 550 is contacting the limit switch 558, and/or if the biasing member 550 is in tension. If step 310 is answered no, the method 300 proceeds to a step 320.

Step 320 comprises providing a user notification to at least one of a user of the dishwasher appliance 100, a manufacturer of the dishwasher appliance 100, or a distributor of the dishwasher appliance 100. The user notification provided indicates that the biasing member 550 of the dishwasher appliance 100 is absent. If step 310 is answered in the affirmative, the method 300 proceeds from step 310 to the step 220 as described above. After the completion of step 220 in the method 300, the method 300 proceeds to step 230, as described above. After the completion of step 230 in the method 300, the method 300 proceeds to step 240, as described above. After the completion of step 240 in the method 300, the method 300 may begin again at step 210.

Figure 12:
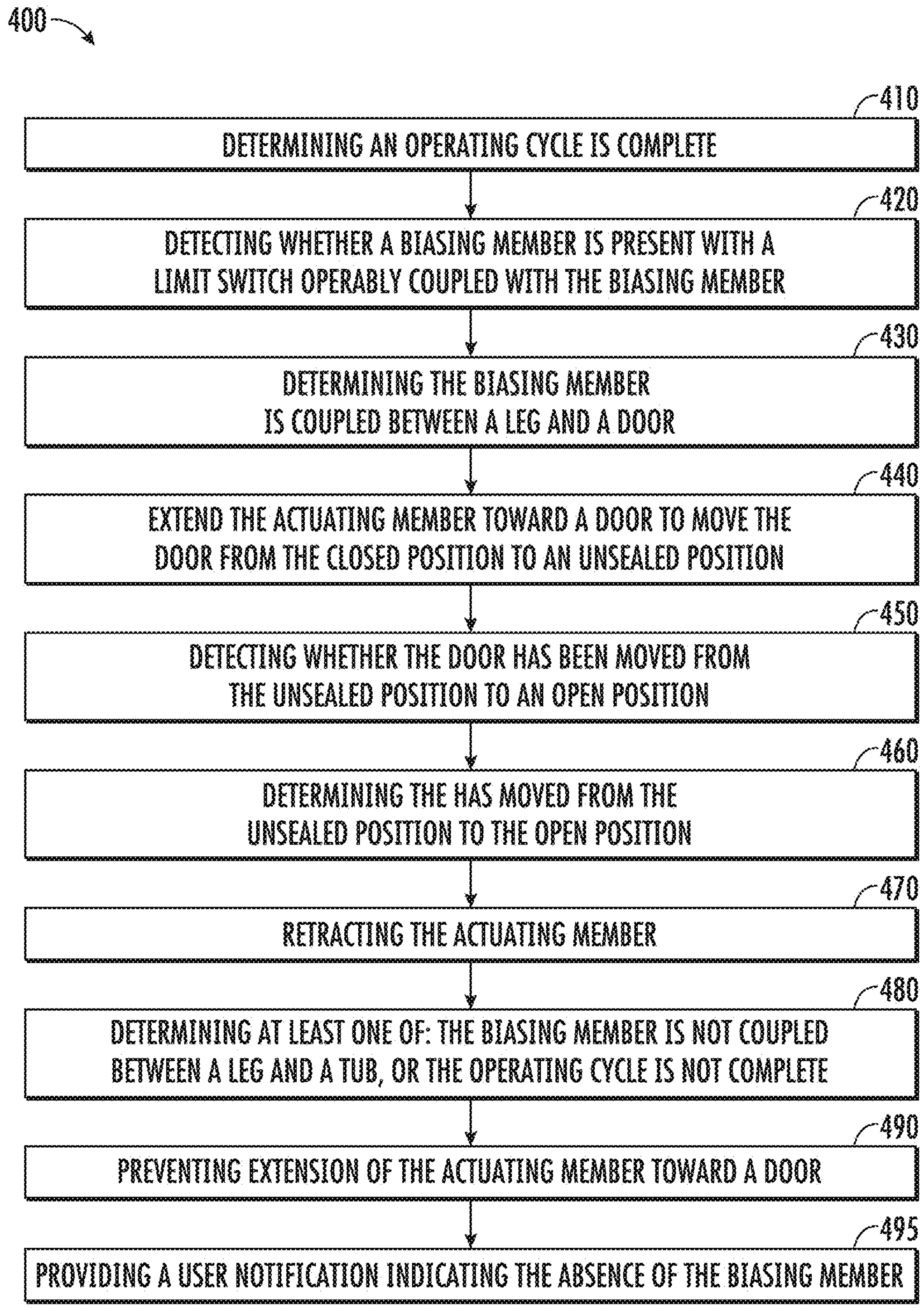
FIG. 12 provides a method for operating an auto-open door of a dishwasher appliance with a limit switch operably coupled to the biasing member in accordance with one embodiment of the present disclosure.

Referring generally to FIG. 12, a method 400 comprises a step 410. Step 410 comprises determining that the operating cycle is complete. The method 400 further comprises a step 420. Step 420 comprises detecting whether the biasing member 550 is present via the limit switch 558, the limit switch 558 being operably coupled with the biasing member 550. Step 430 comprises determining that the biasing member 550 is coupled between the leg, or vertical support 150, and the door 116.

Method 400 further comprises a step 440. Step 440 comprises extending the actuating member toward the door 116 to move the door 116 from the closed position, or sealed position, to the unsealed position. The method 400 further comprises a step 450. Step 450 comprises detecting whether the door 116 has moved from the unsealed position to the open position. Step 460 comprises determining the door 116 has moved from the unsealed position to the open position. Step 470 comprises retracting the actuating member 524. Step 480 comprises determining at least one of the following: the biasing member 550 is not coupled between the leg, or vertical support 150 and the door 116; or the operating cycle is not complete. Step 490 comprises preventing extension of the actuating member 524 toward the door 116. Step 495 comprises providing a user notification indicating the absence of the biasing member 550.

As explained above, aspects of the present subject matter are generally directed to the dishwasher appliance 100 for auto-opening the door 116. Advantageously, the dishwasher appliance 100 as described above is able to extend the actuating member 524 a shorter distance compared to a dishwasher appliance 100 that would use an auto-door-opening mechanism at the top 107 of the tub 104, because the examples provided herein describe the actuator assembly 500 as being coupled with the sidewall 100 of the tub 104. Further, the limit switch 558, in communication with the controller 160, allows for the actuating assembly 500 to move the door 116 safely and efficiently.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwasher appliance comprising:

a tub defined by a top wall, a sidewall coupled with the top wall, and a bottom wall coupled with the sidewall;

a door rotatably coupled with at least one of the sidewall and the bottom wall, the door comprising a contact flange; and an actuating member coupled with the sidewall, the actuating member movable between a retracted position and an extended position, wherein the actuating member in the extended position engages the contact flange, wherein the sidewall of the tub defines a height measured in the vertical direction, and wherein the actuating member is coupled to the sidewall at a mounting location within a lower half of the height of the tub along the vertical direction.

2. The dishwasher appliance according to claim 1 further comprising a collar bracket coupled with the sidewall, wherein the collar bracket extends outwardly from the tub, and wherein the collar bracket has a U-shaped cross-section.

3. The dishwasher appliance according to claim 2, wherein a first recess and a second recess are defined by the collar bracket, and wherein the actuating member extends through the first recess and the second recess.

4. The dishwasher appliance according to claim 1, wherein the actuating member is coupled to the sidewall within between 20% and 50% of the height along the vertical direction.

5. The dishwasher appliance according to claim 4, wherein the actuating member is coupled to the sidewall within between 30% and 40% of the height along the vertical direction.

6. The dishwasher appliance according to claim 5, wherein the actuating member is coupled to the sidewall at about 33% of the height along the vertical direction.

7. The dishwasher appliance according to claim 1 further comprising a sensing assembly for detecting proximity between distal end of actuating member and the contact flange.

8. The dishwasher appliance according to claim 7, wherein the sensing assembly comprises:

a sensor coupled to one of the contact flange of the door and the actuating member; and an activator coupled to one of the contact flange of the door and the actuating member opposite the sensor, wherein the sensor is tripped in response to the activator and the sensor being out of proximity.

9. The dishwasher appliance according to claim 8 further comprising:

a controller configured to:

receive a request to extend the actuating member;

extend the actuating member;

receive a signal that the sensor is tripped; and retract the actuating member in response to receiving the signal from the sensor.

10. The dishwasher appliance according to claim 9 further comprising:

a housing coupled with the sidewall, wherein the actuating member is disposed within the housing; and a driving member communicatively coupled with the controller, the driving member configured to drive and retract the actuating member.

11. The dishwasher appliance according to claim 10, wherein the driving member comprises at least one of:

an electric motor;

a hydraulic motor; or a solenoid.

12. The dishwasher appliance according to claim 8, wherein the activator comprises a magnet.

13. The dishwasher appliance according to claim 12, wherein the sensor comprises at least one of:

a reed switch; or a Hall effect sensor.

14. A method of operating a door actuating mechanism for a dishwasher, the dishwasher comprising a tub having a sidewall, a door rotatably coupled with the tub, and an actuator assembly coupled to the sidewall, the actuator assembly having a driving member and an actuating member operably coupled with the driving member, and a sensing assembly communicatively coupled with the driving member, wherein the sidewall of the tub defines a height measured in the vertical direction, and wherein the actuating member is coupled to the sidewall at a mounting location within a lower half of the height of the tub along the vertical direction, the method comprising:

determining an operating cycle is complete;

extending the actuating member via the driving member to rotate the door;

receiving a deactivation signal from a sensor of the sensing assembly; and retracting the actuating member in response to receiving the deactivation signal from the sensor.

15. The method according to claim 14 further comprising the step of: defining a gap between the tub and the door to permit air flow from the tub.

16. The method according to claim 14, wherein the step of determining the operating cycle is complete comprises:

determining the door is in a closed position.

17. The method according to claim 14, wherein the step of receiving the deactivation signal comprises:

triggering the sensor of the sensing assembly by rotating the door from the actuating member such that a space is defined therebetween.

18. A method of assembling auto-opening a dishwasher appliance, the method comprising:

coupling, rotatably, a door of the dishwasher appliance with a tub of the dishwasher appliance;

disposing one of an activator and a sensor of a sensing assembly within a contact flange of the door;

coupling an actuator assembly with the tub such that the actuator assembly engages the sensing assembly of the contact flange of the door in a closed position and the door in an unsealed position; and coupling an opposite of the activator and the sensor of the sensing assembly with the actuator assembly.

* * * * *